United States Patent [19]

Kage et al.

[11] Patent Number: 4,635,298
[45] Date of Patent: Jan. 6, 1987

[54] INTERFERENCE WAVE DETECTION CIRCUIT FOR USE IN RADIO RECEIVER

[75] Inventors: Kouzou Kage; Hiroshi Watanabe, both of Tokyo, Japan

[73] Assignees: NEC Corporation; Nippon Telegraph & Telephone Public Corp., both of Tokyo, Japan

[21] Appl. No.: 684,824

[22] Filed: Dec. 21, 1984

[30] Foreign Application Priority Data

Dec. 29, 1983 [JP] Japan .................. 58-249794

[51] Int. Cl.$^4$ .............................. H04B 1/10
[52] U.S. Cl. .................... 455/295; 455/303; 455/206; 375/102
[58] Field of Search .......... 455/63, 206, 295, 303, 455/305; 179/170.2; 329/130, 131; 375/102

[56] References Cited

U.S. PATENT DOCUMENTS

| | | | |
|---|---|---|---|
| 4,166,251 | 8/1979 | Ishikagi et al. | 455/205 |
| 4,498,195 | 2/1985 | Ooi et al. | 455/295 |
| 4,525,868 | 6/1985 | Kage et al. | 455/295 |

Primary Examiner—Jin F. Ng
Assistant Examiner—Elissa Seidenglanz
Attorney, Agent, or Firm—Sughrue, Mion, Zinn, Macpeak and Seas

[57] ABSTRACT

An interference wave detection circuit is designed so as to detect whether a beat due to the difference between two carrier wave frequencies is included or not in a received signal for a radio receiver. The detection circuit comprises circuitry for deriving a first binary signal corresponding to a level of a signal of voice frequency band obtained by demodulating the received signal and for deriving a second binary signal corresponding to a level of an envelope signal of an intermediate frequency signal from the received signal to provide a predetermined time difference between the first and second binary signals. The detection circuit further comprises a spoken message detection circuit for detecting that a carrier wave is modulated in a spoken message of the received signal, and a correlation detection circuit for detecting correlation between the first and second binary signals when the output of the spoken message detection circuit is not produced, thereby producing an interference detection signal when the correlation therebetween is detected.

27 Claims, 7 Drawing Figures

INTERFERENCE WAVE DETECTION CIRCUIT FOR USE IN RADIO RECEIVER

BACKGROUND OF THE INVENTION

The present invention relates to an interference wave detection circuit for detecting whether a beat due to the difference between two carrier frequencies is included or not in a received signal of a radio receiver, and more particularly to an interference wave detection circuit suitable for use in a mobile radio communication system of multi-frequency access type without provision of a central control station.

Figure 1:
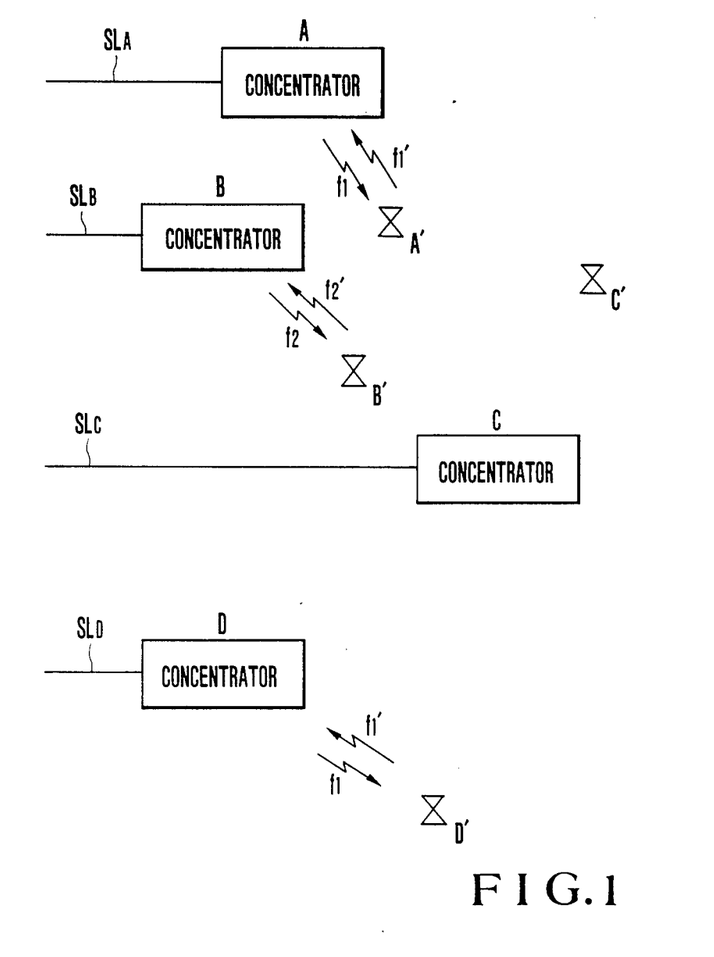
FIG. 1 is a schematic view illustrating an example of configuration of a cordless telephone system.

Mobile radio communication systems of this kind have an application to a cordless telephone system. As illustrated in FIG. 1, radio concentrators A, B and C are connected to respective subscriber lines $SL_A$, $SL_B$ and $SL_C$ and are individually coupled to corresponding radio telephone sets A', B' and C' via radio channels, respectively. If different frequencies are allocated to respective radio channels, there will be no interference among these channel under normal condition. However, such an individual frequency access system is not preferable in view of effective utilization of frequencies. To improve this, it is necessary to utilize a small number of frequencies assigned in common to different sets of radio telephone equipment.

It is now assumed that the cordless telephone system is configured so that two sets of transmission/reception frequencies $f_1$, $f_1'$ and $f_2$, $f_2'$ are assigned to three sets of radio telephone equipment comprising radio concentrators and radio telephone sets and all radio equipment can utilize the two sets of frequencies. When the frequencies $f_1$, $f_1'$ are used by the radio concentrator A and the radio telephone set A', the radio concentrator B and the radio telephone set B' are assumed to start utilization of the same set of frequencies. In such a case, when the telephone system recognizes or acknowledges that the frequencies $f_1$, $f_1'$ are in use, it automatically switches the used frequencies $f_1$, $f_1'$ to the other set of frequencies $f_2$, $f_2'$ to establish a radio channel for the radio concentrator B and the radio telephone set B'.

In this instance, when the radio concentrator C and the radio telephone set C' are to start the use of the channel at the same time, it is detected that both the sets of frequencies $f_1$ and $f_1'$, and $f_2$ and $f_2'$ have been already used. As a result, the channel connection between the concentrator C and the telephone set C' becomes impossible, and therefore they must wait until the frequency occupation by either the radio telephone equipment A, A' or B, B' is released.

In the case where a large number of the above-mentioned systems are installed as terminal equipment for a public communication network, there is a possibility that a radio concentrator D and a radio telephone set D' belonging to another group of telephone equipment attempt to establish a radio channel by the use of frequencies $f_1$, $f_1'$. When this telephone equipment is located far from the first-mentioned group of the telephone equipment to the extent that it does not cause interference therewith, any problem does not arise. However, if the radio telephone set A' moves closer to the radio concentrator D, there may occur interference therebetween. In such a case, it is preferable that the radio telephone sytem be configured so that the radio concentrator D automatically detects the interference and switches to another empty or idle frequency set. To realize this, a system for automatically and precisely detecting the occurrence of interference is required.

SUMMARY OF THE INVENTION

With the above in view, an object of the present invention is to provide an interference wave detection circuit capable of automatically detecting the occurrence of interference in a received output of a radio receiver.

Another object of the present invention is to provide an interference wave detection circuit which can improve interference detection accuracy by making good use of correlation detection means provided therein.

Another object of the present invention is to provide an interference wave detection circuit applicable to a remote radio system substantially free from interference phenomena by combining it with an automatic frequency switching system.

In general, when two carrier waves allocated to the same frequency (strictly speaking, slightly different due to manufacture errors and temperature dependent errors in various components) interfere with each other, a beat due to the difference between the two carrier wave frequencies appears in a received signal. This beat is an envelope signal of a received signal of a radio receiver. Accordingly, the beat can be detected by demodulating the received signal of a radio receiver. Since, in this case, the envelope waveform of the intermediate frequency has a strong correlation to the demodulated waveform, the interference can be detected by detecting the close correlation. Generally, when demodulating a received signal, if the radio receiver is not receiving a communication signal as the received signal (e.g. it is not in a channel used condition), a noise will appear in the received signal. Such a noise may be a noise occurring in the radio equipment or radio channels. Accordingly, it is impossible to discriminate between the noise and the beat merely by measuring the level of the received signal. However, by giving a short time difference between the demodulated received signal and the envelope signal to detect correlation of a signal during the short time period, it is possible to effect discrimination between the noise and the beat. Namely, because the beat can be considered in principle as a sinusoidal continuous wave, the identical state will last before and after the short time period. In contrast, since the noise appears at random, there does not exist the correlation before and after the short time period. The present invention is based on the above-mentioned principle of the correlation and contemplates the provision of an interference wave detection circuit capable of detecting that carrier frequencies interfere with each other by effecting discrimination between a beat and a noise based on the correlation detection.

In the present invention, the demodulation of a received signal may be practiced using various kinds of demodulation methods. For instance, when amplitude-demodulating a received signal, an envelope signal of a carrier wave can be obtained as a demodulated output. Further, when a demodulation circuit of a receiver is of the type which demodulates a frequency modulated (FM) wave or a phase modulated (PM) wave, beats may be detected as demodulated outputs in most cases, and therefore the interference of carrier frequencies can be detected by making use of the detection of the beats.

According to the present invention, there is provided an interference wave detection circuit operative to detect whether a beat due to the difference between two carrier wave frequencies is included or not in a received signal of a radio receiver comprising: first means adapted to provide a predetermined time difference between a signal of voice frequency band obtained by demodulating the received signal and an envelope signal of an intermediate frequency signal derived from the received signal so that the former is delayed relative to the latter and to produce first and second output signals shifted in time to each other in a binary form; second means for detecting that a carrier wave is modulated with a spoken message of the received signal to produce a spoken message detection signal as long as it is detected that the carrier wave is modulated therein; and third means for detecting correlation between the first and binary output signals from the first means for a time duration except for a period of time during which the spoken message detection signal is outputted from said second means, thereby producing an interference detection signal when the correlation therebetween is detected.

The signal of voice frequency band and the envelope signal may be changed to corresponding binary signals before or after a processing for providing the predetermined time difference therebetween.

By way of example, the first means may include comparator means for comparing a level of the signal of voice frequency signal with a predetermined level as means for deriving the first binary output signal and, as means for providing the time difference, a shift register means to which the output of the comparator means is inputted.

Further, the third means comprises first circuit means responsive to the first and second binary output signals shifted in time relative to each other from the first means to produce a correlation detection signal from which the interference detection signal is derived when the correlation is detected as a result of a predetermined correlation detection processing. By way of example, the first circuit means may comprise means for extracting the difference frequency component between the first and second binary output signals shifted in time relative to each other, thereby producing an output indicative of correlation detection when the correlation is detected as a result of the correlation detection processing performed with the extracted frequency difference component.

The third means may further comprise second circuit means responsive to said correlation detection signal to perform a predetermined interference detection processing, thereby producing the interference detection signal for a time duration except for a period of time during which said spoken message detection signal is outputted from said second means. The second circuit means comprises circuit means producing the interference detection signal indicating that the correlation is detected when the first circuit means produces a dc output.

Preferably, the second circuit means may comprise circuit means responsive to the correlation detection signal from the first circuit means to produce the interference detection signal for a predetermined ratio of time except for a period of time during the spoken message detection signal is outputted. Further, the second circuit means may comprise counter circuit means for counting a time during which the correlation detection signal is outputted to produce the interference wave detection signal when the counted value of the counter circuit means is above a predetermined value.

Preferably, a spoken message detection signal from the second means may be coupled to the first circuit means so as to inhibit the correlation detection processing for a period of time during which said spoken message detection signal is outputted.

Preferably, the first circuit means may comprise a fail-safe dual routing correlation detection circuitry comprised of two logic elements respectively responsive to the first and second binary output signals shifted in time relative to each other to produce the correlation detection signal when the correlation is detected as a result of at least one of logical operations independently effected with the two logic elements.

BRIEF DESCRIPTION OF THE DRAWINGS

The features and advantages of an interference wave detection circuit according to the present invention will become more apparent from the following description taken in conjunction with the accompanying drawings, in which.

DETAILED DESCRIPTION OF PREFERRED EMBODIMENTS

Preferred embodiments according to the present invention will be described with reference to attached drawings.

Figure 2:
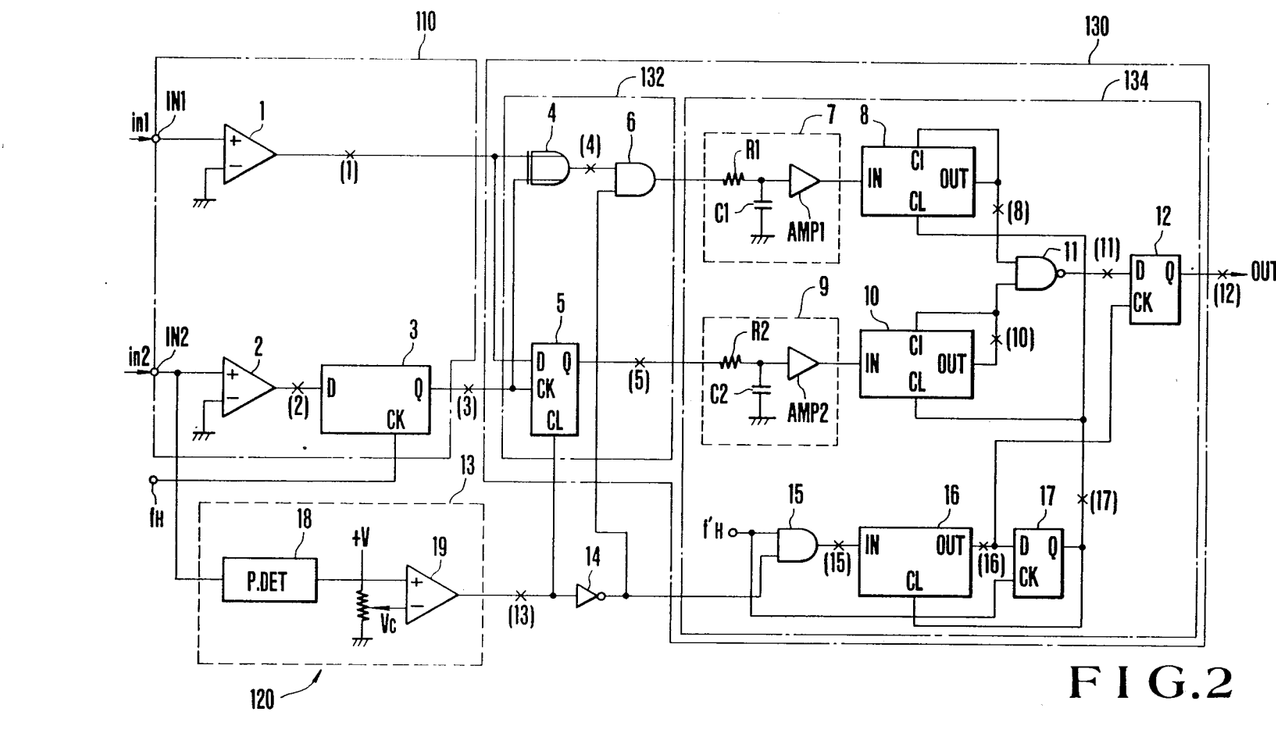
FIG. 2 is a circuit diagram illustrating a first embodiment of an interference wave detection circuit according to the present invention.

FIG. 2 is a block diagram illustrating a first embodiment of an interference wave detection circuit of the invention.

A signal in 1 inputted to an input terminal $IN_1$ located on the leftmost side in this figure is an envelope signal of the intermediate frequency of a radio receiver. Further, a signal in 2 inputted to an input terminal $IN_2$ also located on the leftmost side is a signal having a voice frequency band obtained by demodulating the received signal.

The interference wave circuit comprises a first circuitry 110 adapted to convert the signal in 2 of voice frequency band and the envelope signal in 1 to corresponding binary signals and to provide a predetermined time difference between binary signals corresponding to the signals in 1 and in 2 so that the former is delayed relative to the latter, and a second circuitry 120 for detecting that a carrier wave is modulated with a spoken message of the received signal to produce a spoken message detection signal as long as it is detected that the carrier wave is modulated therein. The interference wave circuit further comprises a third circuitry 130 for detecting correlation between the two binary output signals fed from the first circuitry 110 for a time duration except for a period of time during which the spoken message detection signal is outputted from the second circuitry 120, thereby producing an interference detection signal when the correlation therebetween is detected.

First, the details of the first circuitry 110 will be described.

The signal in 1 applied to the input terminal $IN_1$ is level compared with a predetermined level in a comparator 1 to produce a first binary signal. Further, the signal in 2 applied to the input terminal $IN_2$ is level compared with a predetermined level in a comparator circuit 2 to produce a second binary signal. The second binary signal obtained as an output of the comparator circuit 2 passes through a shift register 3. The shift register 3 is adapted to receive a high speed clock signal $f_H$ at its clock input CK. Thus, the second binary signal is delayed relative to the first binary signal so that a predetermined time difference is provided therebetween.

Second, the second circuitry 120 comprises a spoken message detection circuit 13 comprised of a peak level detector 18 for detecting the peak level of the signal of voice frequency band and a comparator 19 for comparing the output of the peak level detector 19 with a predetermined level.

Third, the third circuitry 130 comprises a first circuit 132 responsive to the binary signals (1) and (3) shifted in time relative to each other from the first circuitry 110 to produce a correlation detection signal when the correlation is detected, and a second circuit 134 responsive to the correlation detection signal to perform a predetermined interference detection processing, thereby producing the interference detection signal for a time duration except for a period of time during which the spoken message detection signal is output from the second circuitry 120.

As understood from the description below, the first circuit 132 comprises a fail-safe dual routing correlation circuit comprised of two logic elements respectively responsive to the binary signals (1) and (3) shifted in time relative to each other to produce a correlation detection signal when the correlation is detected as a result of at least one of logical operations independently effected with the two logic elements.

Thus, the first circuit 132 is constituted as a dual routing circuit and therefore the second circuit 134 connected thereto is also constituted as dual routing circuit.

More particularly, the output of the comparator 1 and the output of the shift register 3 are fed to an exclusive OR circuit 4 serving as an element for correlation detection. The output of the comparator 1 is also fed to an input D of a D-type flip-flop 5 serving as another element for correlation detection and the output of the shift register 3 is also fed to a clock input CK of the flip-flop 5.

The output of the exclusive OR circuit 4 is supplied to an input IN of a counter 8 through an AND circuit 6 and a filter circuit 7 comprising a resistor $R_1$, a capacitor $C_1$ and an amplifier Amp 1. Likewise, the output of the flip-flop 5 is fed to an input IN of a counter 10 through a filter circuit 9 comprising a resistor $R_2$, capacitor $C_2$ and an amplifier Amp 2. Carry outputs from the two counters 8 and 10 are fed to two inputs of a NAND circuit 11. The output of the NAND circuit 11 is fed to an input D of a flip-flop 12.

The above-mentioned signal in 2 inputted to the input terminal $IN_2$ branches to the spoken voice detection circuit 13, and the output of the spoken voice detection circuit 13 is fed to a clear input CL of the flip-flop 5 and branches to one input of an AND circuit 15 through an inverter circuit 14. To the other input of the AND circuit 15, a clock signal $f_H'$ is supplied. The output of the AND circuit 15 is fed to an input of a counter 16. A carry output of the counter 16 is fed to an input D of a flip-flop 17 and a clock input CK of the flip-flop 12. The output of the flip-flop 17 is coupled to respective clear inputs CL of the counter 16, and the counters 8 and 10. To a clock input CK of the flip-flop 17, the above-mentioned clock signal $f_H'$ is supplied.

In this embodiment, as previously mentioned two routes are provided as means for detecting correlation. After spike components are eliminated by the filter circuits 7 and 9, respectively, the outputs of the filter circuits 7 and 9 are counted by the counters 8 and 10 and the counter outputs are fed to the NAND circuit 11. The interference wave detector circuit is configured in a manner that the NAND circuit 11 produces an interference detection signal in response to the fact that either of two routes of correlation detector means detects correlation. The AND circuit 15, the counter 16 and the flip-flop 17 constitute a circuit which provides a predetermined value of accumulated time.

Figure 3A:
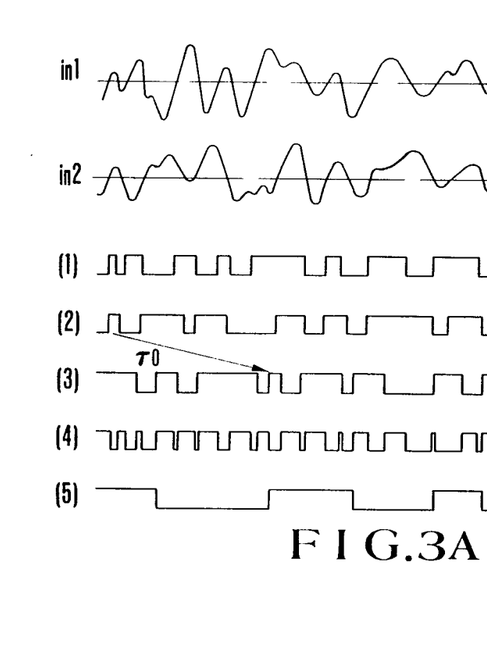
FIGS. 3A, 3B and 4 are time charts showing signal waveforms in the circuit shown in FIG. 2.
Figure 3B:
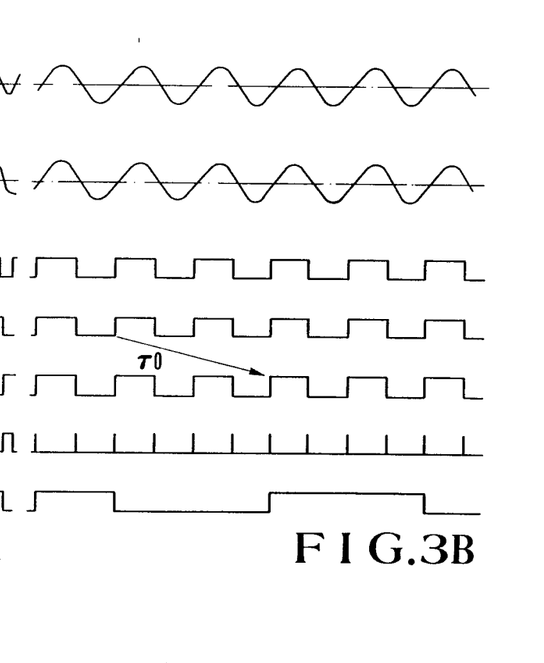

The operation of the circuit configured as shown in FIG. 2 will be described using time charts showing operational waveforms in the FIG. 2 circuit. FIG. 3A shows that a received signal is noise alone and FIG. 3B shows that there occurs interference to produce a beat. The characters on the leftmost side of FIG. 3 correspond to those of signal lines described in FIG. 2, and therefore indicate waveforms appearing on the corresponding signal lines.

Reference is made to the case where there exists random noise in the input signals in 1 and in 2.

The comparator 1 produces an output (1) of a binary signal which is a logical "1" when the input signal in 1 is positive and which is a logical "0" when the input signal in 1 is not positive. Likewise, the comparator circuit 2 produces an output (2) of a binary signal which is a logical "1" when the input signal in 2 is positive and which is a logical "0" when the input signal in 2 is not positive. The binary signal (2) is delayed by the shift register 3 by the time period $\tau_0$. As a result, the shift register 3 produces a binary signal (3) having a time difference with respect to the binary signal (1).

These two binary signals (1) and (3) are fed to the exclusive OR circuit 4 to effect an operation of correlation. The output signal of the exclusive OR circuit 4 contains frequency difference component between both the input signals. If signals (1) and (3) occur at random, the output signal of the exclusive OR circuit 4 will contain "1" and "0" at random as shown at signal (4) in FIG. 3A. Further, these two binary signals (1) and (3) are also fed to the flip-flop 5, thereby to effect an operation of correlation. In this instance, there is a similarly produced output (5) whose logical state varies so that logical "1" and "0" appear at random. Thus, by providing the time difference $\tau_0$, it can be determined that there is no correlation between signals in 1 and in 2 applied to the input terminals $IN_1$ and $IN_2$ in the case where random noise exists in the input signal. Namely, this means that a beat is not produced.

As shown in FIG. 3B, in the case where a beat caused by an interference wave appears in the signals in 1 and in 2 applied to the input terminals $IN_1$ and $IN_2$, when a time difference of a time period $\tau_0$ is given to the binary signal (3), the exclusive OR circuit 4 detects that the difference between frequencies of the two input signals is equal to zero thereby to produce a dc (in this example, "0" level dc) signal as its output signal (4), with a spike shaped waveform therein indicative of a noise produced from a logic circuit eliminated by the filter circuit 7.

Further, in general, correlation may be detected not only with the exclusive OR circuit 4 but also with the flip-flop 5. FIG. 3B illustrates the worst case where binary signals (1) and (3) are just in phase with each other. In this instance, the flip-flop 5 produces an output signal (5) which unstably repeats logical "1" and "0" in response to a jitter of the input signal. Namely, there is the possibility that the output of the flip-flop 5 becomes unstable when two inputs are just in phase with each other. Further, there is the possibility that the output of the exclusive OR circuit 4 becomes unstable when the two inputs are just out of phase by 90 degrees. However, the correlation detection circuit is configured so that the both the outputs of the flip-flop 5 and the exclusive OR circuit 4 are fed to the input of the NAND circuit 11 enabling to produce an output indicative of the presence of correlation as long as either of them defects the correlation. Thus, the correlation detecting function can be maintained even in the worst case.

Figure 4:
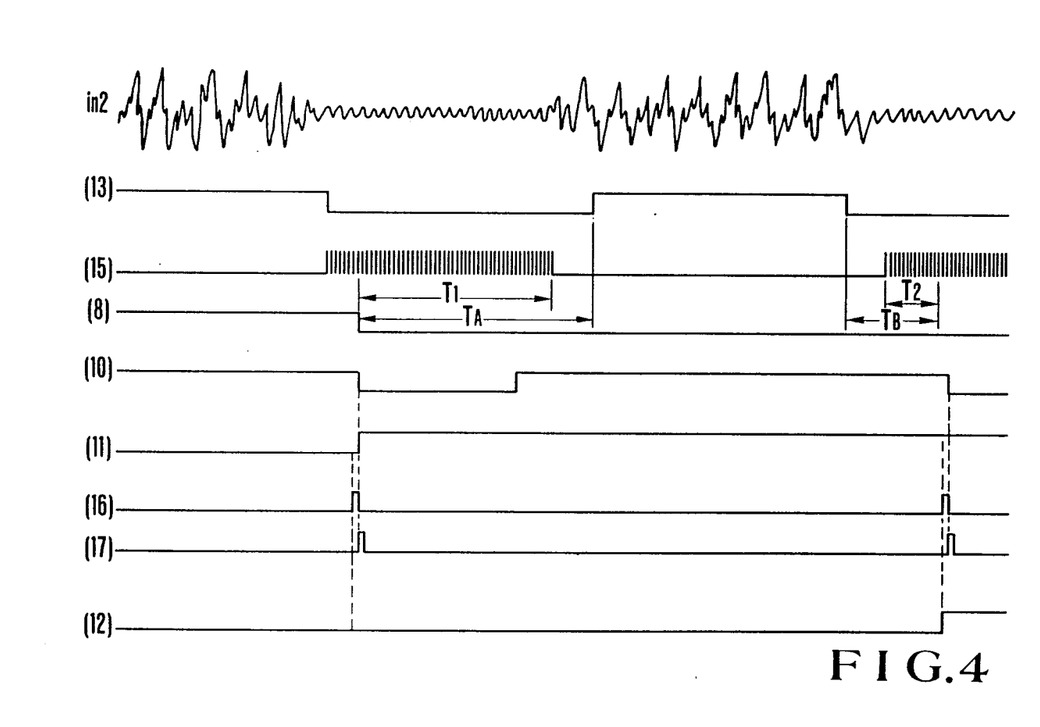

The relationship between the correlation detection circuit and the spoken message detection circuit 13 will be described with reference to FIG. 4, wherein characters shown on the leftmost side in this figure denote voltage waveforms at the corresponding points shown in FIG. 2, respectively. In this example, as shown at in 2 in FIG. 4, there is shown the condition where spoken messages intermittently appear and beats appear therebetween in the input signal in 2.

Where there exist spoken messages, the input signals in 2 has a large peak level, and therefore the spoken message detection circuit 13 produces an output signal (13) of a logical "1". During this time period, the flip-flop 5 receives a reset signal at its clear input CL so that its operation is inhibited. Further since the output of an inverter circuit 14 becomes a logical "0", there is not a signal at the output of the AND circuit 6. Likewise, there is not a signal at the output of the AND circuit 15, as seen from the waveform (15) shown in FIG. 4. On the other hand, when the spoken message is interrupted, the signal (13) becomes a logical "0" to initiate the operation of the flip-flop 5 and the AND circuit 6, with simultaneous appearance of a clock signal f'$_H$ at the output of the AND circuit 15.

The output signal (15) of the AND circuit 15 is counted by the counter 16. When the counter 16 counts up, it produces an output signal (16) serving as a carry output to invert the logical state of the flip-flop 17, thus producing an output signal (17). As a result, the counters 8 and 10 are cleared. Since the counter 16 is also cleared by the signal (17) at the same time, the output signal (16) of the counter 16 falls in a short time and the signal (17) sympathetically falls.

Thus, the counters 8 and 10 start counting operation. In the example shown in FIG. 4, the counter 10 counts up shortly so that the signal (10) again becomes a logical "1". However, since the correlation is being detected by the output of the AND circuit 6, the counter 8 does not count up until a certain long time elapses.

When a time $T_1$ elapses from a time at which the counter 8 is cleared, the service operation restarts. Accordingly, the spoken message detection circuit 13 starts to produce the signal (13) of logical "1". Thus, the operation of the flip-flop 5 and the AND circuit 6 is again inhibited. At this time, the counting operation of the counter 16 is interrupted, but the counted content is maintained as it is. When the spoken message is again interrupted to allow the output signal (13) of the spoken message detection circuit 13 to be a logical "0", the counter 16 starts its counting operation for a third time. When a time $T_2$ elapses, the counter 16 counts up, the output signal (16) from the counter 16 is produced, thereby effecting the same operation as that previously described. Such an operation will be repeated thereafter.

Whenever a time period T during which the spoken message is interrupted amounts to $T=T_1+T_2$, the flip-flop 12 produces a signal (OUT) from its output to indicate that an interference is occurring. Namely, it is judged in the interference wave detection circuit of this embodiment that an interference occurs when correlation is detected for a predetermined ratio $(T_1+T_2/(T_A+T_B))$ of a time period $(T_A+T_B)$ except for a time period during which the spoken message is detected (during which the carrier wave is modulated with the voice signal).

Figure 5:
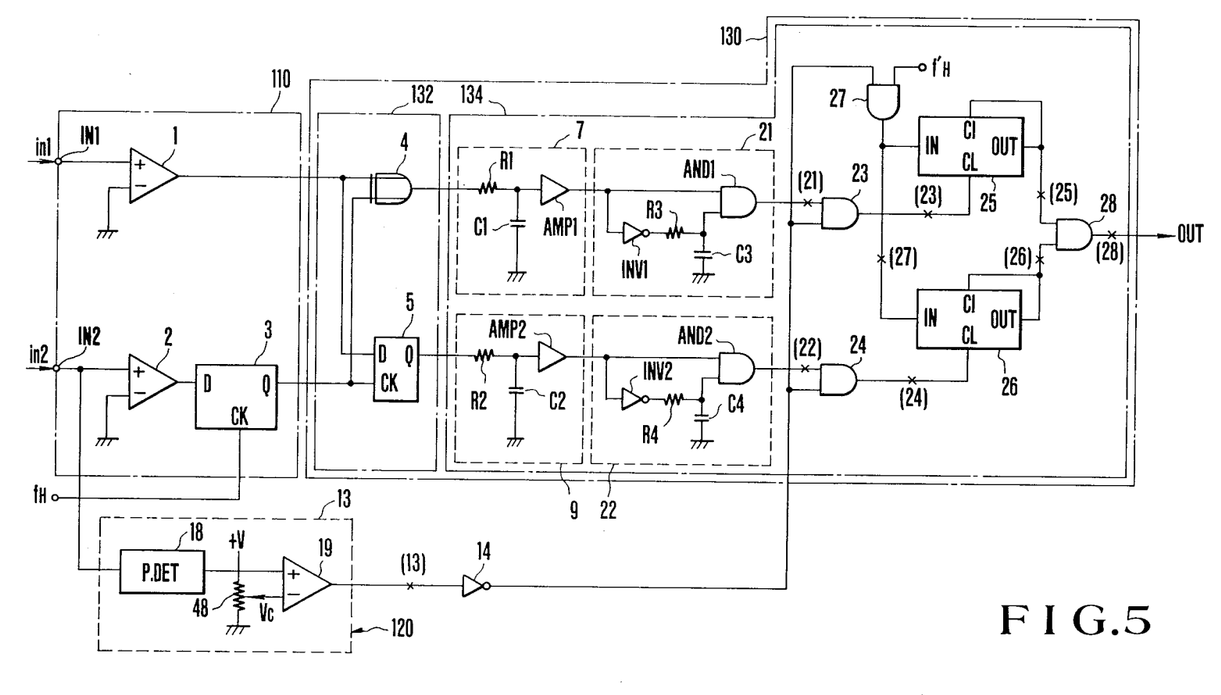
FIG. 5 is a circuit diagram illustrating a second embodiment of an interference wave detection circuit according to the present invention.

Referring to FIG. 5, there is shown a second embodiment of an interference detector circuit according to the present invention. When comparing this embodiment with the above-mentioned first embodiment shown in FIG. 2, there is a major difference in the circuit stages subsequent to the filter circuits 7 and 9. In the second embodiment, there is omitted a circuit which provides an output of the spoken message detection circuit 13 to the flip-flop 5 (and the AND circuit 6) to inhibit its operation. This circuit does not affect the essential operation but is merely effective to reduce noises, and it may be omitted as necessary.

In FIG. 5, to the outputs of the filter circuits 7 and 9, differentiating circuits 21 and 22 are connected, respectively, and their respective outputs are connected to the AND circuits 23 and 24. The differentiating circuit 21 comprises an inverter $INV_1$, a resistor $R_3$, a capacitor $C_3$ and an AND circuit $AND_1$, and the differentiating circuit 22 comprises an inverter $INV_2$, a resistor $R_4$, a capacitor $C_4$ and an AND circuit $AND_2$. The outputs of the AND circuits 23 and 24 are fed to the clear inputs CL of the counters 25 and 26, respectively. To an input IN of the counter 25, a clock signal f'$_H$ is supplied through an AND circuit 27. To the respective inputs of the AND circuit 27 and the above-mentioned AND circuits 23 and 24, the inverting output of the spoken message detection circuit 13 is connected. The outputs of the counters 25 and 26 are fed to two outputs of an OR circuit 28, respectively.

Figure 6:
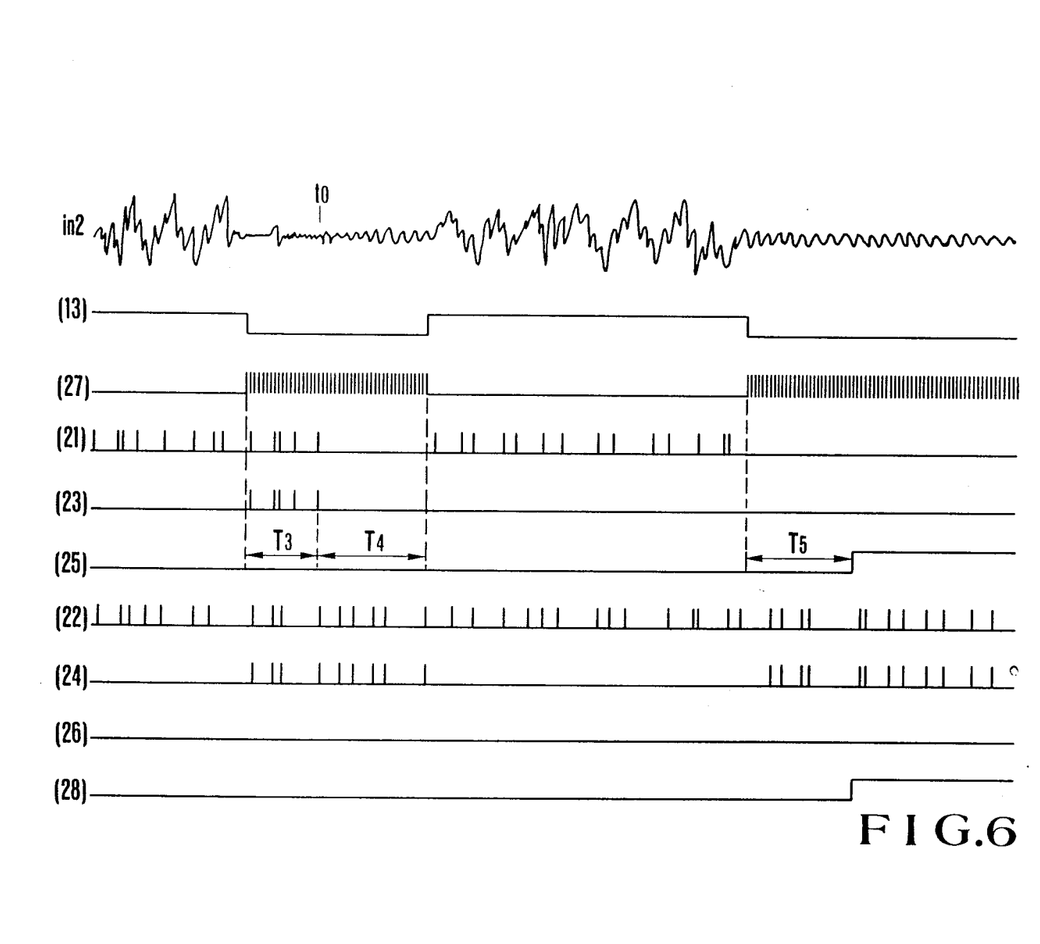
FIG. 6 is a time chart showing signal waveforms in the circuit shown in FIG. 5.

The operation of the circuit thus formed will be described with reference to a time chart shown in FIG. 6. Characters on the leftmost side in FIG. 6 designate waveforms appearing on points of corresponding signs shown in FIG. 5. The differentiating circuits 21 and 22 produce narrow pulses in the positive-going directions when their inputs rise, respectively. The output waveforms in this instance are represented by (21) and (22) in FIG. 6. Assuming that a beat due to interference starts from a time of $t_0$ in FIG. 6, correlation is detected by the exclusive OR circuit 4 on the basis of the above-described operation, thereby ceasing the output of a pulse signal from the differentiating circuit 21 after a time of $t_0$. As a result, the AND circuit 23 is disabled, thereby ceasing to produce an output signal (23). As a result, the counter 25 is enabled because there is no signal at its clear input CL, thereby starting to count the clock signal f'$_H$. After the counter 25 has counted the clock signal f'$_H$ for a time period $T_4$, the spoken message detection circuit 13 produces the detection signal (13) of logical "1". The detection signal (13) is inverted by the inverting circuit 14 and then is inputted to the AND circuit 27. Accordingly, the AND circuit 27 is disabled, thereby ceasing to produce an output signal (27).

When a certain time elapses and the output of the spoken message detection circuit 13 is again interrupted, the AND circuit 27 becomes operative, allowing the clock signal f'$_H$ to again pass therethrough. Thus, the counter 25 effects counting operation in a manner that current counted value is added to the previous counted value. When a time period T$_5$ elapses, the output signal (25) of the counter 25 rises and is maintained at a high level. Thus, an OR circuit 28 produces an output (28) as a signal indicative of interference detection.

The interference detector circuit shown in FIG. 5 is configured so as to effect correlation detection by making use of two routes of circuits, and to determine that there exists interference in a received signal when the OR circuit 28 receives at either input the correlation detection signals respectively fed from the exclusive OR circuit 4 and the flip-flop 5. In the examples of the operation shown in FIG. 6, it is also illustrated that the differentiating circuit 22 produces a pulse signal for time periods T$_4$ and T$_5$ during which beats are received. Even if one of two routes for detecting correlation becomes unstable due to the fact that there exists a particular relationship in regard to the phase between input signals, the correlation detection function can be maintained by the other route similarly to the above-mentioned embodiment.

In the above-mentioned embodiment, the correlation detector means was constituted with an exclusive OR circuit or a flip-flop. In addition, it is also possible to obtain a circuit capable of detecting correlation between two signals with other means, e.g. a multiplier etc. Accordingly, it is of course that the present invention can be practiced with these means.

Further, in the above-mentioned embodiment, it has been described that correlation is detected by making use of different dual routes in order to ensure the operation. However, such a correlation may be detected by using a single route, or a triple or more routes.

In the above-mentioned embodiment, it has been illustrated that means for providing time difference between the two binary signals comprises a circuit for delaying the one binary signal, but the present invention can be also practiced by making use of means for delaying the other binary signal, means for delaying both signals by the delayed amounts different from each other, or means for delaying at least one of two binary signals when they are analog signals, i.e., before they are not converted into binary signals.

As stated above, the present invention can provide a circuit capable of automatically detecting the occurrence of interference in a received output of a radio receiver. With the interference wave detection circuit thus formed, it is possible to improve interference detection accuracy by making good use of correlation detection means. Further, by automatically controlling switching of frequencies using an output detected by this interference detection circuit, a mobile radio system which can automatically eliminate interference may be constituted.

The interference detection wave circuit according to the present invention is advantageous particularly when applied to a cordless telephone system in combination with an automatic frequency switching system.

What is claimed is:

1. An interference wave detection circuit for detecting a beat due to the difference between two carrier wave frequencies included in a received signal of a radio receiver to output an interference detection signal representing the occurrence of interference wherein the receiver provides a signal within a voice frequency band and an envelope signal of the intermediate frequency signal comprising:

first means adapted to provide a predetermined time difference between said signal within a voice frequency band and the envelope signal so that either the signal at a voice frequency band or the envelope signal is delayed relative to the other and to produce first and second binary output signals shifted in time to each other in a binary form;

second means for detecting that a carrier wave is modulated with a spoken message of said received signal to produce a spoken message detection signal as long as it is detected that said carrier wave is modulated therein; and third means for detecting a correlation between said first and second binary output signals from said first means for a time duration, except for a period of time during which said spoken message detection signal is outputted from said second means, to produce the interference detection signal when said correlation therebetween is found.

2. An interference wave detection circuit according to claim 1, wherein said signal within a voice frequency band and said envelope signal are changed to corresponding binary signals before said first means provides or after said first means provides the predetermined time difference between said signal within a voice frequency band and said envelope signal.

3. An interference wave detection circuit according to claim 1 or 2, wherein said third means comprises first circuit means which receives said first and second binary output signals shifted in time relative to each other from said first means, carries out a predetermined process to detect the correlation between said binary signals, and produces a correlation detection signal from which the interference detection signal is derived when the correlation is found.

4. An interference wave detection circuit according to claim 3, wherein said third means further comprises second circuit means responsive to said correlation detection signal to perform a predetermined interference detection processing, thereby producing the interference detection signal for a time duration except for a period of time during which said spoken message detection signal is outputted from said second means.

5. An interference wave detection circuit according to claim 4, wherein said first circuit means of said third means comprises circuit means for extracting a frequency difference component between said first and second binary output signals shifted in time relative to each other, to produce an output signal representing that the correlation is detected when the extracted frequency difference component is equal to a predetermined dc level.

6. An interference wave detection circuit according to claim 5, wherein said second circuit means of said third means comprises circuit means producing the interference detection signal when said first circuit means produces said predetermined dc level indicating that the correlation is detected.

7. An interference wave detection circuit according to claim 6, wherein said second circuit means of said third means comprises circuit means responsive to said correlation detection signal from said first circuit means to produce the interference detection signal for a predetermined ratio of time period except for period of time during said spoken message detection signal is outputted.

8. An interference wave detection circuit according to claim 6, wherein said second circuit means of said third means comprises counter circuit means which carries out a counting operation for a time duration, except for a time period during which said correlation detection signal is outputted from said first circuit means, and produces the interference detection signal when the counted value of said counter circuit means is above a predetermined value.

9. An interference wave detection circuit according to claim 3, wherein said first means includes comparator means for comparing a level of said signal within a voice frequency band with a predetermined level as means for deriving first binary output signal.

10. An interference wave detection circuit according to claim 9, wherein said first means further comprises, as means for providing the time difference, a shift register means to which the output of said comparator means is inputted.

11. An interference wave detection circuit according to claim 9, wherein said second means comprises a peak level detector for detecting the peak level of said signal of voice frequency and a comparator for comparing the output of said peak level detector with a predetermined level.

12. An interference wave detection circuit according to claim 3, wherein said spoken message detection signal from said second means is coupled to said first circuit means so as to inhibit the correlation detection processing for a period of time during which said spoken message detection signal is outputted.

13. An interference wave detection circuit according to claim 3, wherein said first circuit means comprises fail-safe dual routing correlation detection circuitry comprised of two logic elements which respectively receive said first and second binary output signals shifted in time relative to each other, respectively carry-out independently logical operations, and produce said correlation detection signal when at least one of said two logic elements detects the correlation between said binary signals.

14. An interference wave detection circuit for detecting a beat due to the difference between two carrier wave frequencies included in a received signal of a radio receiver to output an interference detection signal representing the occurrence of interference wherein the receiver provides a signal within a voice frequency band and an envelope signal of the intermediate frequency signal, comprising:
first means for deriving a first binary signal corresponding to the level of the signal within a voice frequency band obtained by demodulating said received signal;
second means for deriving a second binary signal corresponding to the level of the envelope signal;
third means for providing a predetermined time difference between said first and second binary signals so that either the signal of voice frequency band or the envelope signal is delayed relative to the other;
fourth means for detecting that a carrier wave is modulated with a spoken message of said received signal to produce a spoken messsage detection signal as long as it is detected that said carrier wave is modulated therein; and
fifth means for detecting a correlation between said first and second binary signals from said first and second means for a time duration except for period of time during which said spoken message detection signal is outputted from said fourth means, thereby producing the interference detection signal when the correlation therebetween is found.

15. An interference wave detection circuit according to claim 14, wherein said first means includes a comparator for comparing the level of said signal within a voice frequency band obtained by demodulating said received signal with a predetermined level.

16. An interference wave detection circuit according to claim 15, wherein said third means includes a shift register to which the output of said comparator is inputted.

17. An interference wave detection circuit according to claim 14, wherein said second means includes a comparator for comparing the level of said envelope signal of the intermediate frequency signal with a predetermined level.

18. An interference wave detection circuit according to claim 14, wherein said fifth means comprises first circuit means responsive to said first and second binary output signals shifted in time relative to each other, for extracting the frequency difference component between said first and second binary output signals to produce an output signal representing that the correlation is detected when the extracted frequency difference component is equal to a predetermined dc level.

19. An interference wave detection circuit according to claim 18, wherein said first circuit means of said fifth means comprises an exclusive OR circuit or a flip-flop.

20. An interference wave detection circuit according to claim 19, wherein said spoken message detection signal is supplied to said exclusive OR circuit or said flip-flop of said first circuit means so as to inhibit the operation of said exclusive OR circuit or said flip-flop for a time period during which said spoken message detection signal is outputted, and said second circuit means comprises a counter circuit adapted to input the correlation detection signal from said first circuit means and to be cleared in synchronism with a carry output of a counted value obtained by counting a predetermined clock signal gated by an inverted signal of said spoken message detection signal, and a flip-flop responsive to a carry output of said counter circuit, to produce the interference detection signal.

21. An interference wave detection circuit according to claim 14, wherein said fifth means further comprises second circuit means responsive to said output signal from said first circuit means and an inverted signal of said spoken message detection signal from said fourth means to produce the interference detection signal when said first circuit means produces a dc output indicating that correlation is detected.

22. An interference wave detection circuit according to claim 21, wherein said second circuit means of said fifth means comprises circuit means responsive to said correlation detection signal from said first circuit means to produce the interference detection signal for a predetermined ratio of time except for a period of time during which said spoken message detection signal is outputted.

23. An interference wave detection circuit according to claim 21, wherein said second circuit means of said fifth means comprises counter means which carries out a counting operation for time duration except for a time period during which said correlation detection signal is outputted from said first circuit means and produces the interference wave detection signal when the counted value of said counter means is above a predetermined value.

24. An interference wave detection circuit according to claim 21, wherein said second circuit means comprises a differentiating circuit connected to the output of said first circuit means, an AND circuit for performing logical product of the output of said differentiating circuit and an inverting output from said fourth means, and a counter which counts a clock signal gated by an inverted output from said fourth means and is cleared in response to the output of said AND circuit, thereby producing an interference detection signal as an output of said counter.

25. An interference wave detection circuit according to claim 14, wherein said fourth means comprises a peak level detector for detecting the peak level of said signal of voice frequency band, and a comparator for comparing the output of said peak level detector with a predetermined level.

26. An interference wave detection circuit according to claim 14, wherein said spoken message detection signal from said fourth means is coupled to said first circuit means so as to inhibit the correlation detection processing thereof for a period of time during which said spoken message detection signal is outputted.

27. An interference wave detection circuit according to claim 14, wherein said first circuit means comprises a fail-safe dual routing correlation detection circuitry comprised of two logic elements which respectively receive said first and second binary output signals shifted in time relative to each other, respectively carry out independently logical operations and, produce said correlation detection signal when at least one of said two logic elements detects the correlation of said binary signals.

* * * * *

UNITED STATES PATENT AND TRADEMARK OFFICE
CERTIFICATE OF CORRECTION

PATENT NO. : 4,635,298
DATED : January 6, 1987
INVENTOR(S) : Kage et al

It is certified that error appears in the above-identified patent and that said Letters Patent is hereby corrected as shown below:

Column 8, line 47  Delete "outputs" and insert --inputs--

Signed and Sealed this

Fourteenth Day of April, 1987

*Attest:*

DONALD J. QUIGG

*Attesting Officer*  *Commissioner of Patents and Trademarks*